US007000644B2

(12) United States Patent
Ichimura et al.

(10) Patent No.: US 7,000,644 B2
(45) Date of Patent: Feb. 21, 2006

(54) FLEXIBLE HOSE

(75) Inventors: Nobuo Ichimura, Gunma (JP); Hiromi Takasaki, Sano (JP); Yoshikazu Takamatsu, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/743,490

(22) Filed: Dec. 23, 2003

(65) Prior Publication Data

US 2004/0134553 A1 Jul. 15, 2004

(30) Foreign Application Priority Data

Dec. 26, 2002 (JP) ............................ 2002-378667
Dec. 26, 2002 (JP) ............................ 2002-378669

(51) Int. Cl.
*F16L 11/00* (2006.01)

(52) U.S. Cl. ...................... 138/109; 138/114; 138/125; 138/126; 138/112; 138/148; 285/123.16; 285/256

(58) Field of Classification Search ................ 138/114, 138/112, 148, 104, 120, 125, 109; 285/123.16, 285/256
See application file for complete search history.

(56) References Cited

U.S. PATENT DOCUMENTS 2,838,074 A * 6/1958 Lauck ..................... 285/123.1
2,956,586 A 10/1960 Ziegler et al.
3,841,671 A * 10/1974 Walker .................. 285/148.21
3,948,292 A * 4/1976 Goto et al. ................ 138/113
3,986,732 A * 10/1976 Stanley .................... 285/121.3
4,025,675 A * 5/1977 Jonda ........................ 428/36.2
4,793,638 A * 12/1988 Baldwin, Jr. ........... 285/148.13
4,886,305 A * 12/1989 Martin .................. 285/123.17
4,928,736 A * 5/1990 Muszynski .................. 138/178
5,005,613 A 4/1991 Stanley
5,069,255 A * 12/1991 Muszynski .................. 138/149
5,102,012 A * 4/1992 Foster ......................... 222/40
5,156,191 A * 10/1992 Walker et al. ............. 138/113
5,186,502 A * 2/1993 Martin .................... 285/123.1
5,285,744 A 2/1994 Grantham et al.
5,285,826 A * 2/1994 Sanders et al. ............... 141/59
5,343,738 A * 9/1994 Skaggs .................... 73/40.5 R
5,351,727 A * 10/1994 Sanders et al. ............... 141/59
5,513,681 A * 5/1996 Sanders et al. ............... 141/59
5,865,216 A * 2/1999 Youngs ...................... 138/135
6,032,699 A 3/2000 Cochran et al.
6,123,112 A * 9/2000 Wagner ...................... 138/114
6,345,647 B1 * 2/2002 Niki et al. .................. 138/126
6,536,479 B1 * 3/2003 Wilson et al. .............. 138/137
6,745,796 B1 * 6/2004 Ikemoto et al. ............. 138/126
2002/0046830 A1 * 4/2002 Ulrich et al. ............... 165/183
2005/0051310 A1 * 3/2005 Inoue et al. ................ 165/154

FOREIGN PATENT DOCUMENTS

JP 2595578 B2 1/1997

* cited by examiner

*Primary Examiner*—James Hook
(74) *Attorney, Agent, or Firm*—Foley & Lardner LLP

(57) ABSTRACT

A flexible hose for use as a refrigerant passageway in a vehicular refrigerating cycle has an inner hose and an outer hose. The outer hose covers the inner hose with a space formed in a given distance. The outer hose and the inner hose are formed of resin having flexibility.

11 Claims, 7 Drawing Sheets

FLEXIBLE HOSE

CROSS REFERENCE TO RELATED APPLICATIONS

This application claims benefit of priority under 35 U.S.C § 119 to Japanese Patent Application No.2002-378667, filed on Dec. 26, 2002 and Japanese Patent Application No.2002-378669, filed on Dec. 26, 2002, the entire contents of which are incorporated by reference herein.

BACKGROUND OF THE INVENTION

1. Field of the Invention

The present invention relates to a flexible hose for use as a refrigerant passageway in a vehicular refrigerating cycle.

2. Description of the Related Art

A flexible hose of the related art, for use as a refrigerant passageway in a vehicular refrigerating cycle, is disclosed in Japanese Patent No. 2595578.

The flexible hose of the related art takes the form of a double-layer conduit structure that is comprised of an outer hose and an inner hose. The outer hose and the inner hose are formed of rubber. Inside the outer hose, the inner hose is freely inserted to the outer hose at a position spaced from an inner surface thereof by a given distance. Coupling the outer hose to a compressor input of the refrigerating cycle allows a low pressure refrigerant passage to be established. Coupling the inner hose to a compressor output of the refrigerating cycle allows a high pressure refrigerant passage to be established. With such a structure, a contact area between the hose and the atmosphere decreases. Further, since the inner hose functions as a flow passage for high pressure fluid that leaks at a high leakage rate and the outer hose functions as a flow passage for low pressure fluid that leaks at a lower leakage rate than that of high pressure fluid, the flexible hose encounters less leakage in refrigerant that is leaked from a whole of the flexible hose to the outside thereof and less thermal diffusion in refrigerant that is diffused from a whole of the flexible hose to the outside thereof.

However, since the flexible hose of the related art takes the form of the double-layer conduit structure comprised of the outer hose and the inner hose both of which are made from rubber, the flexible hose encounters an increase in weight per one piece of hose. Further, although the above literature discloses a shape of a fitting formed on a distal end of the flexible hose, there is no disclosure for a method of mounting the fittings to the distal ends of the outer hose and the inner hose. Therefore, it was hard to mount the fittings to the distal ends of the outer hose and the inner hose under a condition where a central axis of the inner hose and a central axis of the outer hose are held in coincidence with respect to one another.

SUMMARY OF THE INVENTION

It is therefore an object of the present invention to provide a flexible hose configured in the form of a double-layer structure that is decreased in weight per one piece of hose and has a coupling assembly enabled to align a central axis of an inner hose to a central axis of an outer hose.

To achieve the above object, the present invention provides a flexible hose for use as a refrigerant passageway in a vehicular refrigerating cycle, comprising an inner hose, and an outer hose covering the inner hose with a space in a given distance, wherein at least one of the outer hose and the inner hose is formed from resin having a flexibility.

According to the present invention, at least one of the outer hose and the inner hose is formed from resin having the flexibility. Since resin has a lower specific gravity than rubber, reduction in weight of the flexible hose can be realized.

In a preferred embodiment of the present invention, the flexible hose is further comprised of a coupling assembly which includes a sleeve-like inner conduit coupling including an inside connecting portion adapted to be coupled to an associated inside connecting portion, a plurality of retainer segments extending in a radial direction thereof and an inner hose fixing portion fixedly retained by a distal end of the inner hose, and a sleeve-like outer conduit coupling including an outside connecting portion adapted to be coupled to an associated outside connecting portion, a retainer fixing portion that fixedly retains the retainer segments of the inner conduit coupling, and an outer hose fixing portion fixedly retained by a distal end of the outer hose, with the outer conduit coupling having an inner diameter slightly larger than an outer diameter of the retainer segments of the inner conduit coupling, wherein caulking an outer circumferential periphery of the retainer fixing portion after inserting the inner conduit coupling, fixedly retained with the distal end of the inner hose, into an interior of the outer conduit coupling fixedly retained with the distal end of the outer hose allows the retainer segments to be fixedly retained with the retainer fixing portion.

According to this embodiment, inserting the inner conduit coupling fixedly retained by the distal end of the inner hose into the interior of the outer conduit coupling fixedly retained by the distal end of the outer hose and subsequently caulking the outer circumferential periphery of the retainer fixing section allows the retainer segments to be fixedly retained by the retainer fixing portion. Accordingly, it is possible to easily obtain the flexible hose with the distal end mounted with the coupling assembly wherein the central axis of the inner hose is aligned with the central axis of the outer hose.

DETAILED DESCRIPTION OF THE PREFERRED EMBODIMENTS

With reference to a first embodiment, a flexible hose according to the present invention is described. With reference to second and third embodiments, description is made of coupling assemblies mounted to distal ends of the flexible hoses according to the present invention.

(First Embodiment)

A flexible hose 1 is used for a circulation path for refrigerant adapted to be circulated through a refrigerating cycle such as a vehicular air conditioning device and a vehicular refrigerating unit.

A vehicular air conditioning device has component elements, such as a compressor, a condenser and an evaporator, that are located in a vehicle in a manner described below. The compressor is mounted in an engine side and compresses refrigerant under a high temperature and high pressure. The condenser is located in a vehicle side and cools high pressure refrigerant. The evaporator is located in the vehicle side and allow refrigerant to be expanded to remove heat from the surrounding. Accordingly, the compressor is subjected to vibrations of an engine during start-up and operation thereof and is apt to vibrate in a mode differing from that of vibration of a vehicle body. If the compressor and the condenser, and/or the compressor and the evaporator are coupled to one another using a hard pipe as a path to permit refrigerant to be circulated, both distal ends of the pipe are subjected to different vibration modes, resulting in damage of the hard pipe. In consideration of such an issue, the flexible hose 1 has flexibility. The flexibility of the flexible hose 1 provides an ease of assembling work during fitting-out of the vehicle.

Figure 1:
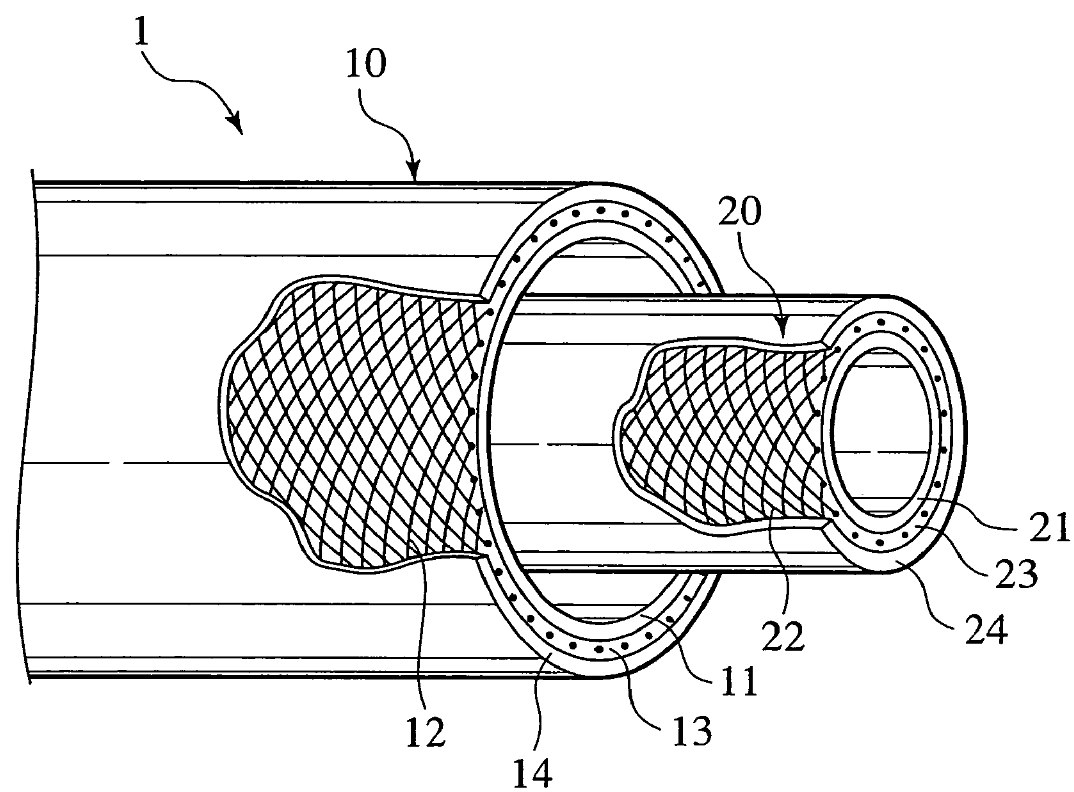
FIG. 1 is a perspective view of a flexible hose of a first embodiment according to the present invention.

As shown in FIG. 1, the flexible hose 1 includes an outer hose 10 and an inner hose 20. Inserting the inner hose 20 into the interior of the outer hose 10 in a position spaced from an inner surface of the outer hose 10 by a given distance allows the flexible hose 1 to take a double-layer conduit structure.

The outer hose 10 takes the form of a three-layer structure that is comprised of a base layer 11, a reinforcing layer 13 and a protecting layer 14 concentrically laminated in this order. The inner hose 20 takes the form of a three-layer structure that is comprised of a base layer 21, a reinforcing layer 23 and a protecting layer 24 concentrically laminated in this order. The outer hose 10 and the inner hose 20 have flexibilities, respectively. Also, the outer hose 10 has a higher flexibility than the inner hose 20. The flexible hose 1 is laid inside the vehicle such that high pressure refrigerant passes through the interior of the inner hose 20 and low pressure refrigerant passes through a space defined between the inner hose 20 and the outer hose 10.

The base layer 11 of the outer hose 10 is made from rubber raw material such as butyl rubber and formed in a substantially conduit profile. The reinforcing layer 13 is formed by winding a reinforcing yarn 12, made of raw material of polyester system, onto an outer circumferential periphery of the base layer 11. The protecting layer 14 is formed by covering an outer circumferential periphery of the reinforcing layer 13 with rubber raw material such as butyl rubber and EPDM rubber.

The base layer 21 of the inner hose 20 is made from resin raw material such as nylon and formed in a substantially conduit profile. The reinforcing layer 23 is formed by winding a reinforcing yarn 22, made of raw material of polyester system, onto an outer circumferential periphery of the base layer 21. The protecting layer 24 is formed by covering an outer circumferential periphery of the reinforcing layer 23 with resin raw material such as polyurethane.

The flexible hose thus constructed has advantageous features described below.

Since the inner hose includes the base layer and the protecting layer formed from resin having the flexibility and a small specific gravity, the flexible hose can be realized in a light weight.

Since the outer hose includes the base layer and the protecting layer formed from rubber raw material softer than resin raw material used for the inner hose, the flexible hose has an improved bending property and an improved laying-out capability. Therefore, in case of bending the flexible hose, it becomes possible to preclude only the inner hose, accommodated inside the outer hose, from being bent.

Due to the presence of the inner hose having the reinforcing layer formed by winding the reinforcing yarn onto the outer circumferential periphery of the base layer, the inner hose has an improved pressure tightness without causing the flexibility of the inner hose from being sacrificed. Also, due to the formation of a heat insulating layer formed by air trapped in a fabric of the reinforcing yarn, the amount of heat exchange between refrigerant inside the inner hose and refrigerant inside the outer hose decreases, providing a capability of precluding a refrigerating cycle from being deteriorated in performance.

Since the inner hose includes the protecting layer at the outer circumferential periphery of the reinforcing layer, flow resistance of refrigerant between the outer hose and the inner hose can be reduced.

Due to an ability of permitting high pressure refrigerant to flow through the inner hose and low pressure refrigerant to flow through the space between the inner hose and the outer hose, the high pressure refrigerant flows through a narrow cross sectional area. Consequently, it becomes possible for the amount of refrigerant to be filled in the refrigerating cycle at a minimum. Also, as an alternative of the inner hose, the base layer of the inner hose may be further formed in a two-layer structure (composed of an innermost layer and a resin layer). The innermost layer is formed of a nylon film with a thickness in the order of approximately 100 $\mu$m. The resin layer is formed by covering an outer circumferential periphery of the innermost layer with urethane. In addition, formed on the outer circumferential periphery of the resin layer are the reinforcing layer and the protecting layer laminated in this order. Comparing the base layer formed in the two-layer structure to the base layer formed in a single resin layer, the base layer formed in the two-layer structure has a high flexibility and, due to the presence of the resin layer and the reinforcing layer adjacent to one another, adhesiveness is improved, resulting in a stabilized strength quality.

(Second Embodiment)

Figure 2:
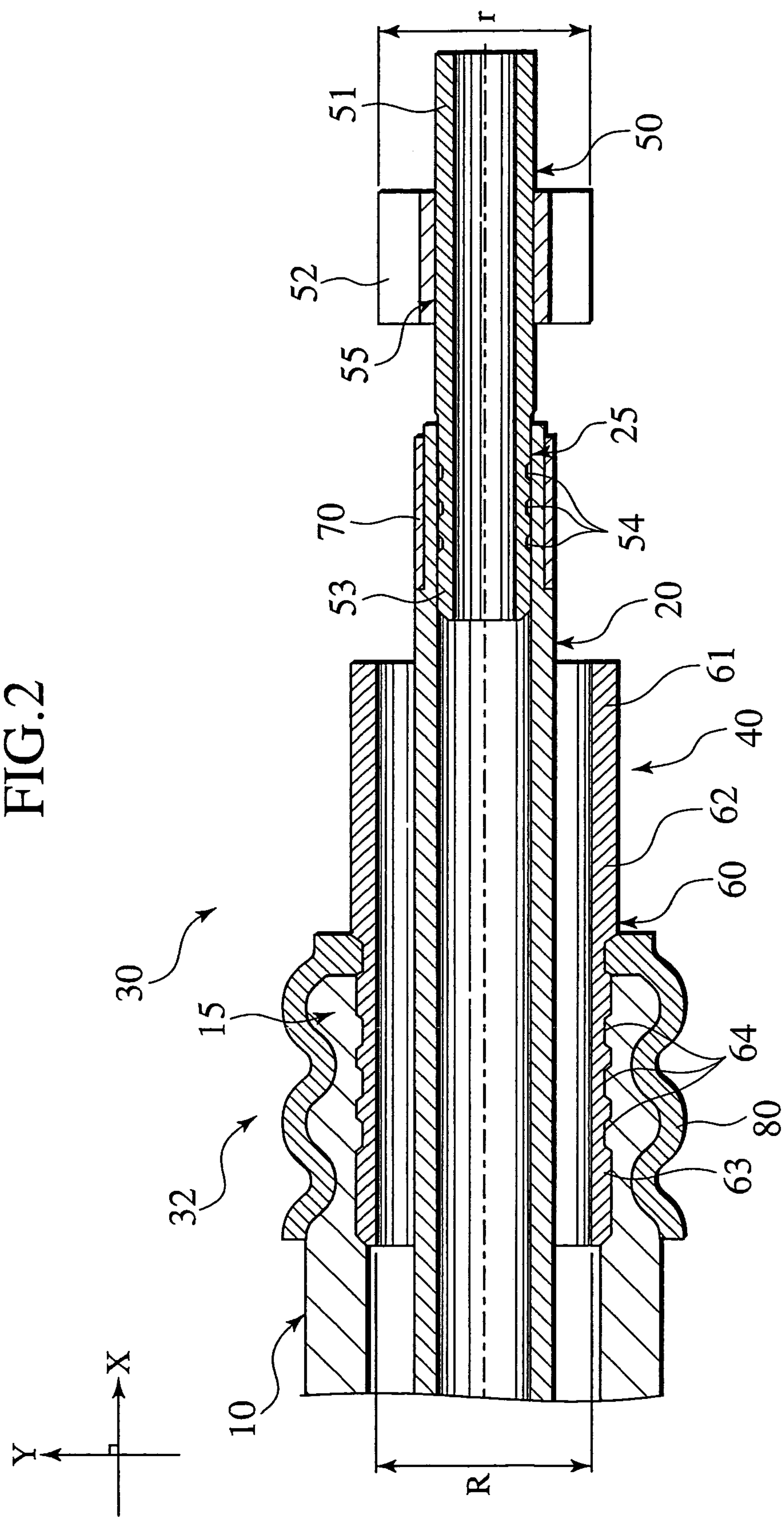
FIG. 2 is a cross sectional view, taken along an axial direction, of a flexible hose of a second embodiment of the present invention, with an inner hose being shown to be inserted to an outer hose.

As shown in FIG. 2, a flexible hose 30 is comprised of the outer hose 10, the inner hose 20 and a coupling assembly 40. The inner hose 20 is inserted through the interior of the outer hose 10. The coupling assembly 40 is mounted to a distal end 32 of the flexible hose 30. The coupling assembly 40 is comprised of an inner conduit coupling 50 and an outer conduit coupling 60.

The inner conduit coupling 50 has a concentric shape with the inner hose 20 and includes an inside connecting portion 51, retainer segments 52 and an inside hose fixing portion 53. The inside connecting portion 51 is integrally formed with the inner conduit coupling 50 and adapted to be coupled to an associated inside connecting portion (not shown) of a receiver opening that receives the distal end 32 of the flexible hose 30. A plurality of retainer segments 52 are located on an outer circumferential periphery of a central area 55 of the inner conduit coupling 50. The inside hose fixing portion 53 is integrally formed with the inner conduit coupling 50 and fixedly retained by a distal end 25 of the inner hose 20.

The outer conduit coupling 60 is formed in a concentric shape with the outer hose 10 and includes an outside connecting portion 61, a retainer fixing portion 62 and an outside hose fixing portion 63. An inner diameter R of the outer conduit coupling 50 is slightly larger than an outer diameter r of the retainer segments 52. The outside connecting portion 61 is integrally formed with the outer conduit coupling 60 and is adapted to be coupled to an associated outside connecting portion (not shown) of the receiver opening that receives the distal end 32 of the flexible hose 30. The retainer fixing portion 62 is integrally formed with the outer conduit coupling 60 and fixedly retains the retainer segments 52 of the inner conduit coupling 50. The outside hose fixing portion 63 is integrally formed with the outer conduit coupling 60 and fixedly retained by a distal end 15 of the outer hose 10.

The inside connecting portion 51 and the outside connecting portion 61 have circumferential peripheries formed with recesses, respectively, in which sealing O-rings (not shown) are mounted. This allows the inside connecting portion 51 and the outside connecting portion 61 to be tightly coupled to the associated inside connecting portion and the associated outside connecting portion, respectively.

By pressing an inner collar 70, formed on the distal end 25 of the inner hose 20, after inserting the inside hose fixing portion 53 of the inner conduit coupling 50 into the distal end 25 of the inner hose 20, the inside hose fixing portion 53 is fixedly retained by the inner hose 20. Also, formed on an outer circumferential periphery of the inside hose fixing portion 53 in a circumferential direction and axially spaced along an axial direction are a plurality of recessed portions 54. When pressing the inner collar 70 and fixedly retaining the inside hose fixing portion 53 with the inner hose 20, an inner surface of the distal end 25 of the inner hose 20 bites into the interiors of the recessed portions 54. Thus, the inner conduit coupling 50 becomes hard to fall out from the inner hose 20.

By pressing an outer collar 80, disposed on the distal end 15 of the outer hose 10 after inserting the outside hose fixing portion 63 of the outer conduit coupling 60 into the distal end 15 of the outer hose 10, the outside hose fixing portion 63 is fixedly retained by the outer hose 10. Also, formed on an outer circumferential periphery of the outside hose fixing portion 63 in a circumferential direction and axially spaced along an axial direction are a plurality of recessed portions 64. When pressing the outer collar 80 and fixedly retaining the outside hose fixing portion 63 with the outer hose 11, an inner surface of the distal end 15 of the outer hose 10 bites into the interiors of the recessed portions 64. Thus, the outer conduit coupling 60 becomes hard to fall out from the outer hose 10.

Figure 3:
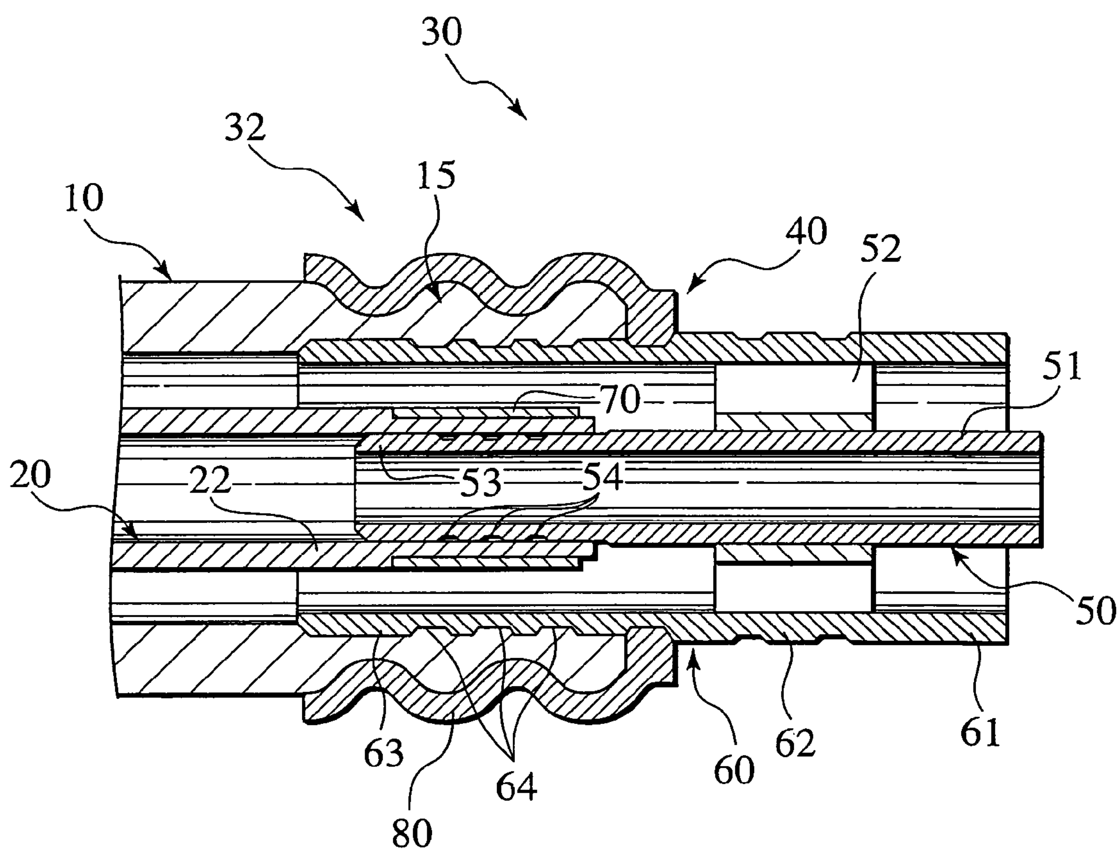
FIG. 3 is a cross sectional view, taken along an axial direction, of the flexible hose of the second embodiment of the present invention, with the inner hose being shown to be coupled to the outer hose.
Figure 4:
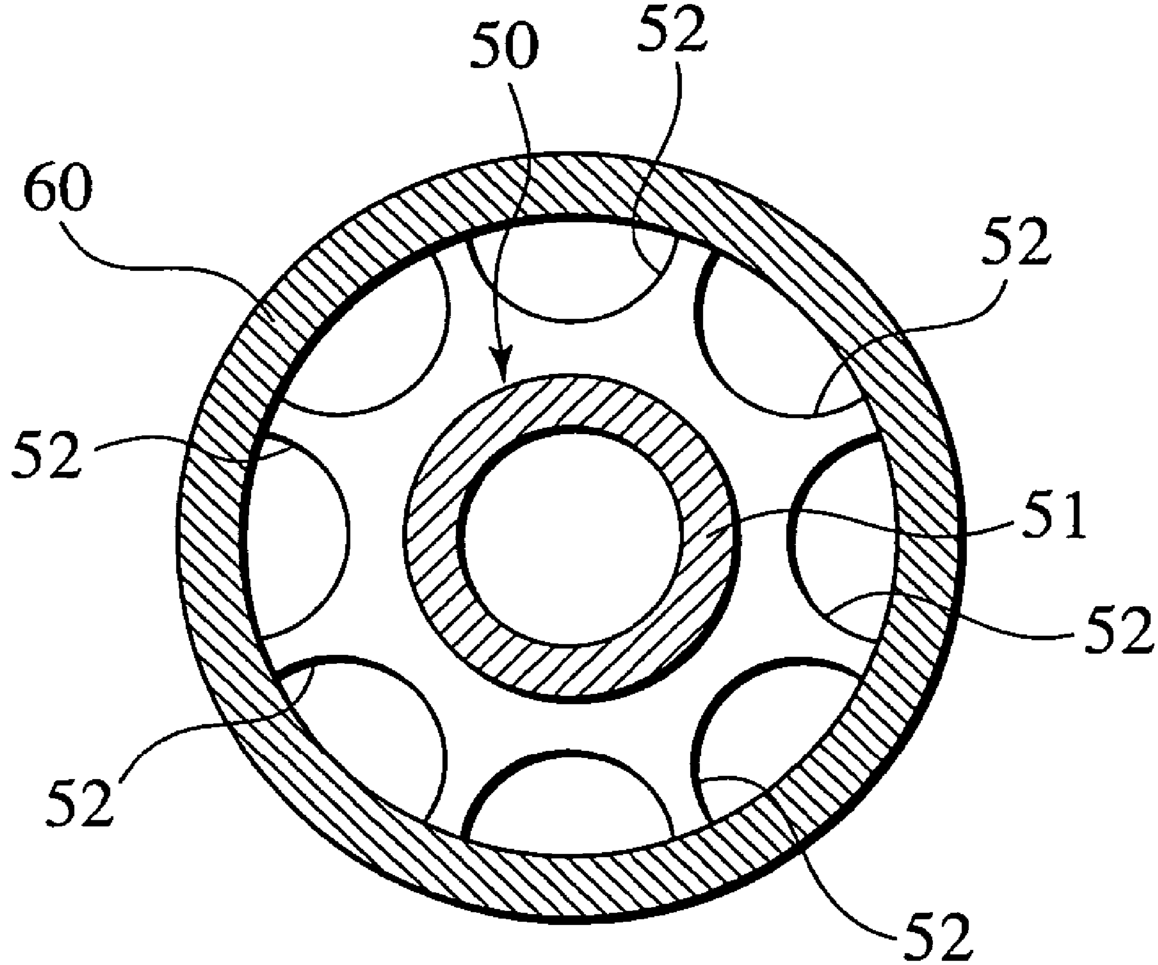
FIG. 4 is a cross sectional view of a distal end face of the flexible hose of the second embodiment according to the present invention.

The coupling assembly 40 is assembled in a manner described below. The inner hose 20, in which the inner conduit coupling 50 is caulked and retained, is inserted into the outer hose 10, in which the outer conduit coupling 60 is caulked and retained, until the retainer segment 52 is positioned in the retainer fixing portion 62. Then, pressing the outer circumferential periphery of the retainer fixing portion 62 allows the retainer segments 52 to be fixedly retained by the retainer fixing portion 62. In such a manner, the coupling assembly 40 of the flexible hose 30 is completed (see FIGS. 3 and 4).

Also, although the presently filed embodiment has been described with reference to an exemplary case that employs a method of caulking the inner collar 70 to allow the distal end 25 of the inner hose 20 to fixedly retain the inside hose fixing portion 53 and a method of caulking the outer collar 80 to allow the distal end 15 of the outer hose 10 to fixedly retain the outside hose fixing portion 63, the present invention is not limited to such an exemplary case, and it may be possible to use a hand clamp to allow the inside hose fixing portion 53 to be fixedly retained with the inner hose 20 while permitting the outside hose fixing portion 63 to be fixedly retained with the outer hose 10.

The flexible hose 30 thus constructed in such a way has advantageous features described below. Since the retainer segment 52 with a concentric profile with the inner hose 20 is fixedly retained with the retainer fixing portion 62 with a concentric profile with the outer hose 10, it is possible to provide a flexible hose coincident in a central axis of the inner hose and a central axis of the outer hose.

Figure 5:
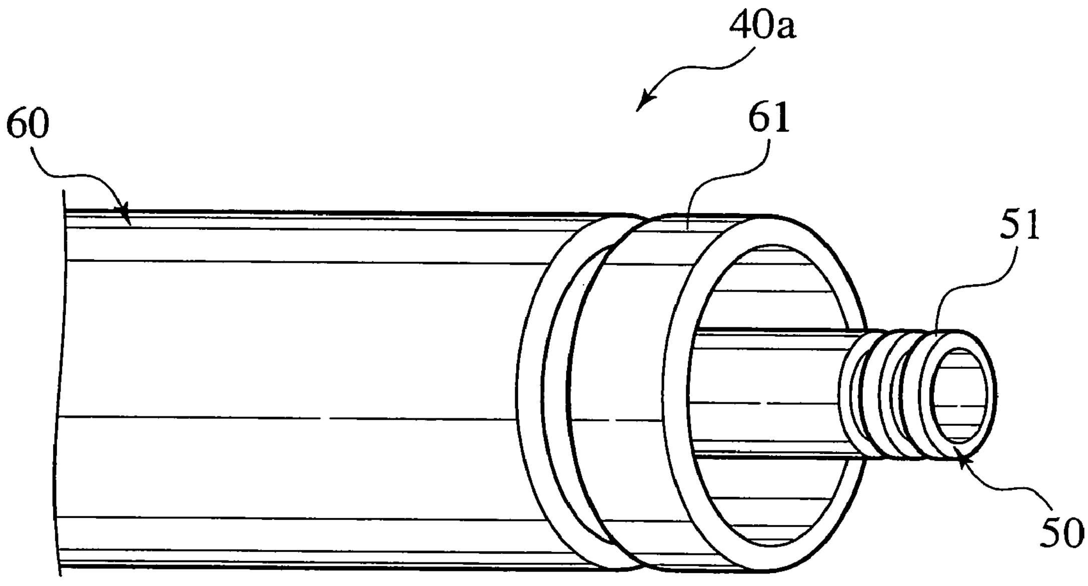
FIG. 5 is a perspective view showing a modified form of a coupling assembly forming part of the flexible hose of the second embodiment of the present invention.
Figure 6:
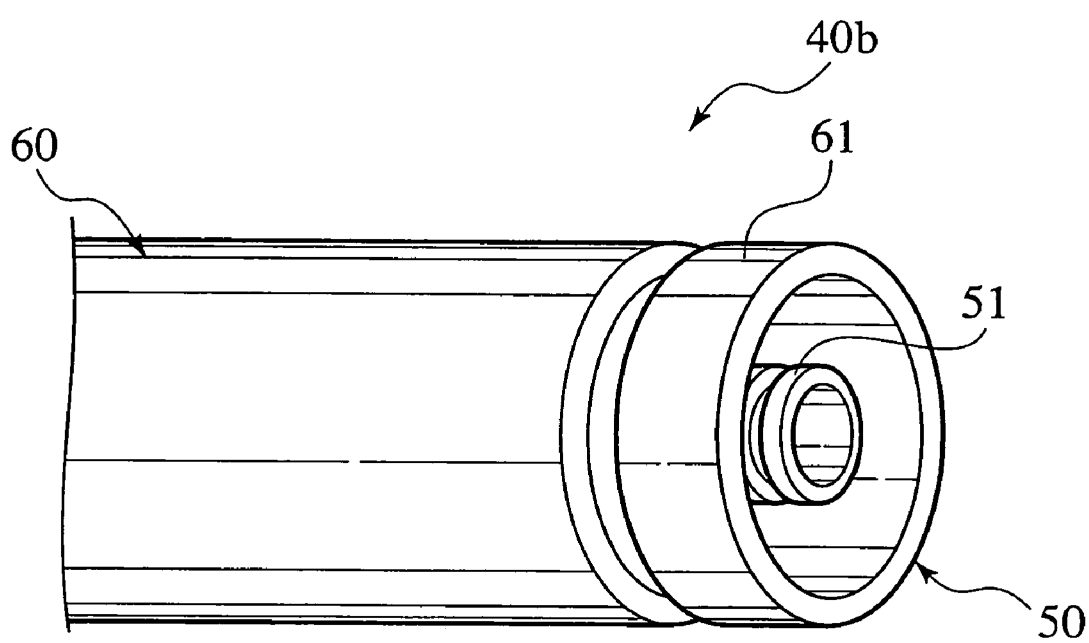
FIG. 6 is a perspective view showing another modified form of the coupling assembly forming part of the flexible hose of the second embodiment of the present invention.

As an alternative of the presently filed embodiment, instead of the coupling assembly 40, the flexible hose 30 may include coupling assemblies 40*a*, 40*b* such as those shown in FIGS. 5 and 6. The coupling assembly 40 is configured such that the distal end of the inside connecting portion 51 of the inner conduit coupling 50 slightly protrudes from a distal end face of the outside connecting portion 61 of the outer conduit coupling 60. On the contrary, the coupling assembly 40*a* is configured such that a whole of the inside connecting portion 51 protrudes from a distal end face of an outside connecting portion 61*a* (see FIG. 5). This provides an ease of connecting work for the coupling assembly 40*a* and an associated connecting member.

Further, the coupling assembly 40*b* is formed such that a distal end face of an inside connecting portion 51 and a distal end face of an outside connecting portion 61 are brought into coincidence with respect to one another (see FIG. 6). This allows a total length of the coupling assembly 40*b* to be shortened, providing a capability for the flexible hose 30 to be laid in a position with less spatial margin.

(Third Embodiment)

Figure 7:
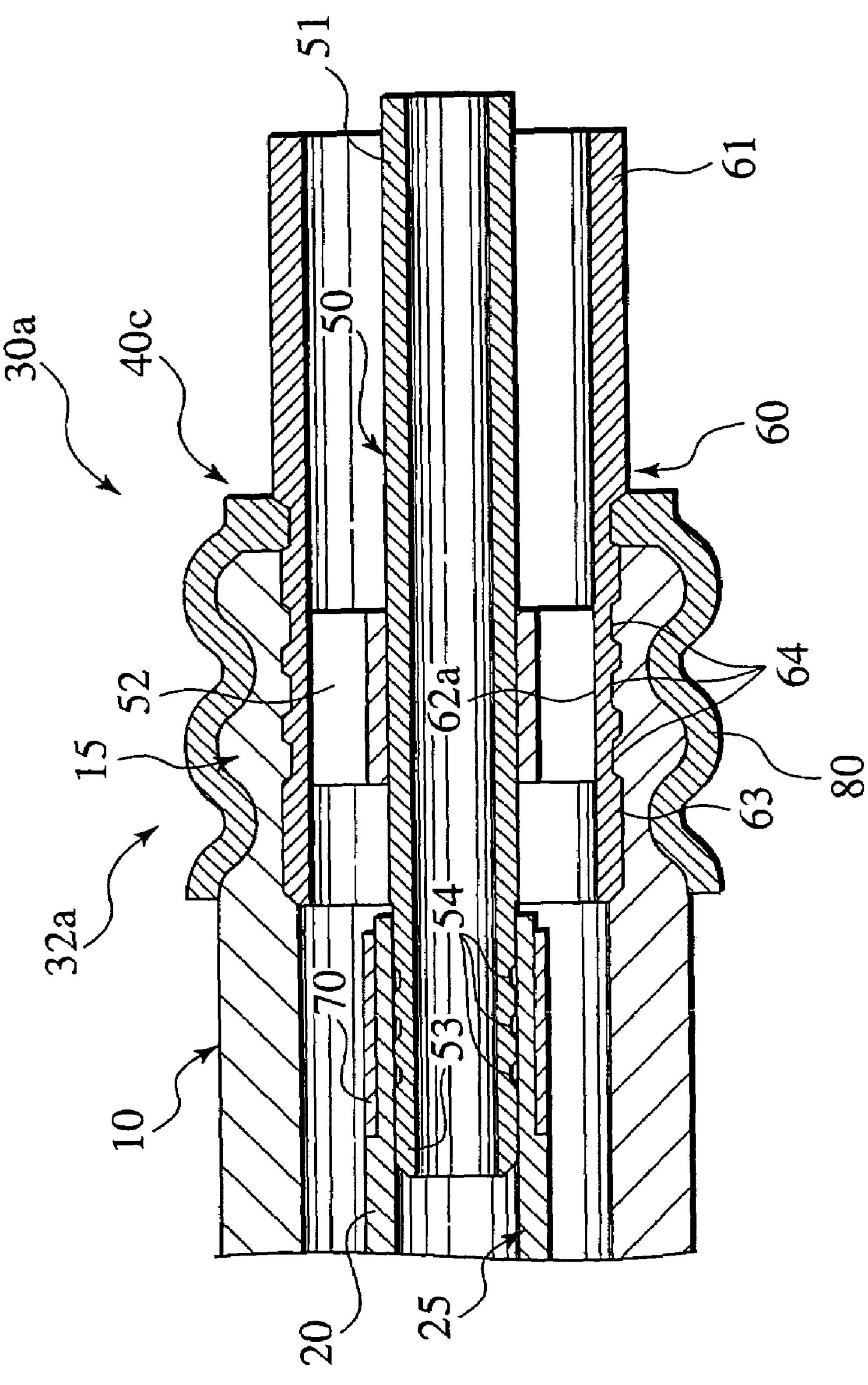
FIG. 7 is a cross sectional view, taken along an axial direction, of a flexible hose of a third embodiment of the present invention, with an outer hose being shown to be coupled to an inner hose.

As shown in FIG. 7, a flexible hose 30*a* includes the outer hose 10, the inner hose 20 and a coupling assembly 40*c*. The inner hose 20 is inserted to the interior of the outer hose 10. The coupling assembly 40*c* is mounted to a distal end 32*a* of the flexible hose 30*a*. The coupling assembly 40*c* is comprised of the inner conduit coupling 50 and the outer conduit coupling 60.

A retainer fixing portion 62*a* of the flexible hose 30*a* is located in a position closer to the outside hose fixing portion 63 of the outer conduit coupling 60 than the retainer fixing portion 62 of the flexible hose 30. More particularly, a plurality of recessed portions 64 are formed on an outer circumferential periphery of the retainer fixing portion 62*a* and when permitting the outer conduit coupling 60 to be fixedly retained with the outer hose 10, the recessed portions 64 of the retainer fixing portions 62*a* are opposed to the outer collar 80 mounted to the outer circumferential periphery of the outer hose 10.

The coupling assembly 40*c* is assembled in a manner described below. The outside hose fixing portion 63 of the outer conduit coupling 60 is inserted into the interior of the outer hose 10, and the inner hose 20, by which the inner conduit coupling 50 is caulked and fixedly retained, is inserted into the outer hose 10 such that the retainer segments 52 are positioned inside the retainer fixing portion 62*a*. Then, the outer circumferential periphery of the outer collar 80 is pressed and the inner surface of the distal end 15 of the outer hose 10 bites into the recessed portions 64 while the retainer segment 52 is fixedly retained with the interior of the retainer fixing portion 62*a*. This allows the outer hose 10 and the outer conduit coupling 60, and the outer conduit coupling 60 and the inner conduit coupling 50 to be mutually coupled to one another, thereby completing assembling work for the coupling assembly 40*c* (see FIG. 7).

Also, although the presently filed embodiment has been described with reference to an exemplary case that employs a method of caulking the inner collar 70 to allow the distal end 25 of the inner hose 20 to fixedly retain the inside hose fixing portion 53 of the inner hose 20 and a method of caulking the outer collar 80 to allow the distal end 15 of the outer hose 10 to fixedly retain the outside hose fixing portion 63 of the outer hose 10, the present invention is not limited to such an exemplary case, and it may be possible to use a hand clamp to allow the inside hose fixing portion 53 to be fixedly retained with the inner hose 20 while permitting the outside hose fixing portion 63 to be fixedly retained with the outer hose 10.

The flexible hose 30*a* thus constructed in such a way has advantageous features described below. Since the retainer segment 52 with a concentric profile with the inner hose 20 is fixedly retained with the retainer fixing portion 62*a* with a concentric profile with the outer hose 10, it is possible to provide a flexible hose coincident in a central axis of the inner hose and a central axis of the outer hose.

Further, caulking the outer collar of the outer hose allows the outside hose fixing portion of the outer conduit coupling to be fixedly retained with the outer hose and the retainer segment of the inner conduit coupling to be fixedly retained with the retainer fixing portion of the outer conduit coupling at the same time, enabling reduction in the number of steps for assembling the coupling assembly.

What is claimed is:

1. A flexible hose for use as a refrigerant passageway in a vehicular refrigerating cycle, comprising:

a cylindrical inner hose formed from resin having flexibility;

a cylindrical outer hose formed from resin having flexibility and covering the inner hose with a space in a given distance, wherein the inner and outer hose are configured to allow high pressure refrigerant of the cycle to flow through an interior of the inner hose and low pressure refrigerant of the cycle to flow through a space between the inner hose and the outer hose, an inner sleeve-like conduit coupling retained fixedly by a distal end of the inner hose; and an outer sleeve-like conduit coupling retained fixedly by a distal end of the outer hose, wherein the inner conduit coupling and the outer conduit coupling are configured so that pressing an outer circumferential periphery of the outer conduit coupling after inserting the inner conduit coupling into the outer conduit coupling allows the inner conduit coupling to be fixedly retained with the outer conduit coupling.

2. The flexible hose according to claim 1, wherein the outer hose is formed from raw material having a higher flexibility than that of raw material forming the inner hose.

3. The flexible hose according to claim 1, wherein the inner conduit coupling comprises:

an inside connecting portion adapted to be coupled to an associated inside connecting portion;

a plurality of retainer segments extending in a radial direction thereof; and an inside hose fixing portion fixedly retained by a distal end of inner hose; and the outer conduit coupling comprises:

an outside connecting portion adapted to be coupled to an associated outside connecting portion;

a retainer fixing portion retaining fixedly the retainer segments of the inner conduit coupling; and an outside hose fixing portion retaining fixedly by a distal end of the outer hose, wherein the retainer fixing portion and the retainer segments are configured so that pressing an outer circumferential periphery of the retainer fixing portion after inserting the inner conduit coupling into the outer conduit coupling allows the retainer segments to be fixedly retained with the retainer fixing portion.

4. The flexible hose according to claim 3, wherein the retainer fixing portion is disposed in the outside hose fixing portion and pressing an outer circumferential periphery of the outside hose fixing portion allows the retainer segments to be fixedly retained with the retainer fixing portion.

5. The flexible hose according to claim 3, wherein the outer conduit coupling has an inner diameter slightly larger than an outer diameter of the retainer segments of the inner conduit coupling.

6. The flexible hose according to claim 1, wherein at least one of the outer hose and the inner hose takes the form of a doubled-layer structure that includes a base layer, and a reinforcing layer formed by winding a reinforcing yarn onto an outer circumferential periphery of the base layer.

7. The flexible hose according to claim 6, wherein the inner conduit coupling comprises:

an inside connecting portion adapted to be coupled to an associated inside connecting portion;

a plurality of retainer segments extending in a radial direction thereof; and an inside hose fixing portion retained fixedly by a distal end of the inner hose, and the outer conduit coupling comprises:

an outside connecting portion adapted to be coupled to an associated outside connecting portion;

a retainer fixing portion retaining fixedly the retainer segments of the inner conduit coupling; and an outside hose fixing portion retained fixedly by a distal end of the outer hose, wherein the retainer fixing portion and the retainer segments are configured so that pressing an outer circumferential periphery of the retainer fixing portion after inserting the inner conduit coupling, into the outer conduit coupling allows the retainer segments to be fixedly retained with the retainer fixing portion.

8. The flexible hose according to claim 7, wherein the outer conduit coupling has an inner diameter slightly larger than an outer diameter of the retainer segments of the inner conduit coupling.

9. The flexible hose according to claim 1, wherein at least one of the outer hose and the inner hose takes the form of a three-layer structure that includes a base layer, a reinforcing layer formed by winding a reinforcing yarn onto an outer circumferential periphery of the base layer, and a protecting layer formed on an outer circumferential periphery of the reinforcing layer.

10. The flexible hose according to claim 9, wherein the inner conduit coupling comprises:

an inside connecting portion adapted to be coupled to an associated inside connecting portion;

a plurality of retainer segments extending in a radial direction thereof; and an inside hose fixing portion retained fixedly by a distal end of the inner hose, and the outer conduit coupling comprises:

an outside connecting portion adapted to be coupled to an associated outside connecting portion;

a retainer fixing portion retaining fixedly the retainer segments of the inner conduit coupling; and an outside hose fixing portion retained fixedly by a distal end of the outer hose, wherein the retainer fixing portion and the retainer segments are configured so that pressing an outer circumferential periphery of the retainer fixing portion after inserting the inner conduit coupling into the outer conduit coupling allows the retainer segments to be fixedly retained with the retainer fixing portion.

11. The flexible hose according to claim 10, wherein the outer conduit coupling has an inner diameter slightly larger than an outer diameter of the retainer segments of the inner conduit coupling.

* * * * *